United States Patent [19]

Chu

[11] Patent Number: 4,890,084
[45] Date of Patent: Dec. 26, 1989

[54] INDUCTANCE STRAIN GAUGE

[75] Inventor: Li Chu, Wuhan, China

[73] Assignee: The Institute of Rock & Soil Mechanics Academia Sinica, Wuhan, China

[21] Appl. No.: 192,991

[22] Filed: May 12, 1988

[51] Int. Cl.$^4$ ............................................. H01F 21/06
[52] U.S. Cl. ................................. 336/30; 33/DIG. 13; 73/779; 73/862.64; 336/75; 336/136
[58] Field of Search ................... 33/DIG. 13; 73/779, 73/862.64; 336/136, 130, 30, 75

[56] References Cited

U.S. PATENT DOCUMENTS

| | | | |
|---|---|---|---|
| 2,438,359 | 3/1948 | Clapp | 336/136 X |
| 2,854,646 | 9/1958 | De Michele | 73/779 X |
| 2,870,630 | 1/1959 | Silvertsen | 73/779 X |
| 3,000,079 | 9/1961 | Howell et al. | 336/136 X |
| 3,223,952 | 12/1965 | Slenker | 336/136 |
| 3,295,365 | 1/1967 | Larrigan et al. | 73/779 |
| 3,858,138 | 12/1974 | Gittleman et al. | 336/136 |
| 4,623,840 | 11/1986 | Fujimura et al. | 336/136 X |

FOREIGN PATENT DOCUMENTS 743325 12/1943 Fed. Rep. of Germany ...... 336/136

OTHER PUBLICATIONS

*Mark's Standard Handbook for Mechanical Engineers,* Ninth Edition, McGraw-Hill Book Company, N.Y., 1987, pp. 5-57 to 5-61.

*Primary Examiner*—Thomas J. Kozma
*Attorney, Agent, or Firm*—Ward Brown; Robert W. Beach

[57] ABSTRACT

Side-by-side inductor coils are wound in a single layer around a thin flat tubular frame. The frame has a closed end portion and is mounted on an insulative base sheet. An elongated thin magnetic core is cantilevered from a insulative connecting rod and normally is positioned inside the frame approximately centered between the two coils. The end portion of the connecting rod remote from the frame is secured to the base sheet. The base sheet can be applied to a specimen to be stress tested and is formed to withstand elongation and compression. Lengthwise sliding of movement of the magnetic core in the coil frame due to stress applied to the specimen indicates the strain of the specimen.

13 Claims, 2 Drawing Sheets

INDUCTANCE STRAIN GAUGE

BACKGROUND OF THE INVENTION

1. Field of the Invention

The present invention relates to strain gauges. More specifically, the present invention relates to an improved inductance strain gauge usable for measuring nonelectric variables such as strain of a material being stress-tested.

2. Prior Art

Known resistance strain gauges have wire or foil grids bonded to or embedded in a substrate. The substrate is attached to a material to be stress-tested. When the wire grid elongates or is compressed due to the applied stress, the resistance of the wire or foil grid changes. Use of such gauges is described in *Mark's Standard Handbook for Mechanical Engineers*, Ninth Edition, McGraw-Hill Book Company, New York, 1987, at pages 5-58 to 5-59 as follows:

> Gages must be properly selected in accordance with manufacturer's recommendations. The surface to which the gage is applied must be clean, the proper cement must be used, and the gage assembly must be coated for protection against environmental conditions (e.g., moisture).
> A gaging unit, usually a Wheatstone bridge or a ballast circuit . . . is needed to detect the signal resulting from the change in resistance of the strain gage. The strain and, therefore, the signal are often too small for direct handling, so that amplification is needed, with a metering discriminator for magnitude evaluation.
> The signal is read or recorded by a galvanometer, oscilloscope, or other device. Equipment specifically constructed for stain measurement is available to indicate or record the signal directly in strain units. Static strains are best gaged on a Wheatstone bridge, with strain gages wired to it . . . . With the bridge set so that the only balance is the change of resistance in the active-strain gage, the potential difference between the output terminals becomes a measurement of strain. Since the gage is sensitive to temperature as well as strain, it will measure the combined effect. However, if a "dummy" gage, cemented to an unstressed piece of the same metal subjected to the same climatic conditions, is wired into the bridge leg adjacent to the one containing the "active" gage, the electric-resistance temperature effect is canceled out. Thus the active gage reports only that which is taking place in the stressed plate. The power supply can be either ac or dc.
> It is sometimes useful to make both gages active— e.g., mounted on opposite sides of a beam, with one gage subjected to tension and the other to compression. Temperature effects are still compensated, but the bridge output is doubled. In other instances, it may be desirable to make all four bridge arms active gages. The experimenter must determine the most practical arrangement for the problem at hand and must bear in mind that the bridge unbalances in proportion to the difference in the strains of gages located in adjacent legs and to the sum of strain in gages located in opposite legs.

When the deformation is large or the specimen is cracked, the resistance wire or foil may be broken so that the stress test cannot be completed. For those circumstances in which a resistance strain gauge is appropriate, there still is the requirement for complicated and expensive monitoring equipment such as high-power amplifier, metering discriminator, galvanometer, oscilloscope, etc. As noted in the passage quoted above, care must be taken to guard against moisture. In addition, the electrical cable connected to the resistance strain gauge must not be too long and, in the case of an AC power supply to the resistance strain gauge, the frequency must be chosen carefully. All in all, careful planning and highly skilled technicians are required if reliable measurements are to be made.

Known inductance strain gauges have thousands of coils wound in ten or more layers and an enclosing shield of magnetic conductive material. The exciting frequency of the AC supply can be several kilohertz to 20 kilohertz. The load impedance of the known inductance strain gauge must be ten times or more than the output impedance of the coils. The supply current must be small to ensure linearity and stability of response. The connecting cable should be short. The overall size of the known inductance strain gauge is large so that it cannot be applied directly to a specimen, particularly if the specimen is small.

SUMMARY OF THE INVENTION

The principal object of the present invention is to provide an improved strain gauge of simple inexpensive construction, adaptable to a variety of testing environments, having high sensitivity, usable with inexpensive equipment or at least less expensive equipment than required for resistance strain gauges, and easy to use.

In the preferred embodiment of the present invention, the foregoing object is accomplished by providing a thin flat inductance strain gauge having a small insulative frame of short rectangular cross section mounted on an insulative base sheet. Insulative adhesive secures side-by-side coils on the frame, each coil being wound in a single layer. The frame forms an elongated thin rectangular internal cavity open at one end. An elongated thin flat magnetic core is normally centered lengthwise between the coils and is cantilevered from an insulative connecting rod extending lengthwise out of the frame cavity. The frame, including its single layer coil, is secured to one end portion of the base sheet. The other end portion of the base sheet extends below the projecting portion of the connecting rod and includes accordion-like wrinkles or waves permitting elongation or compression of the base sheet. The end of the connecting rod remote from the magnetic core is connected to the base sheet at a location opposite the accordion-like wrinkles or waves from the coils.

The improved inductance strain gauge in accordance with the present invention is extremely small and thin, miniature as compared to known inductance strain gauges, and the base sheet can be applied directly to the specimen to be tested. Sensitivity is high and the measuring range is broad. The connecting cable can be much longer than for known inductance or resistance gauges. In addition, unlike resistance gauges, the improved gauge in accordance with the present invention can be used in wet and low-temperature environments.

DETAILED DESCRIPTION

Figure 1:
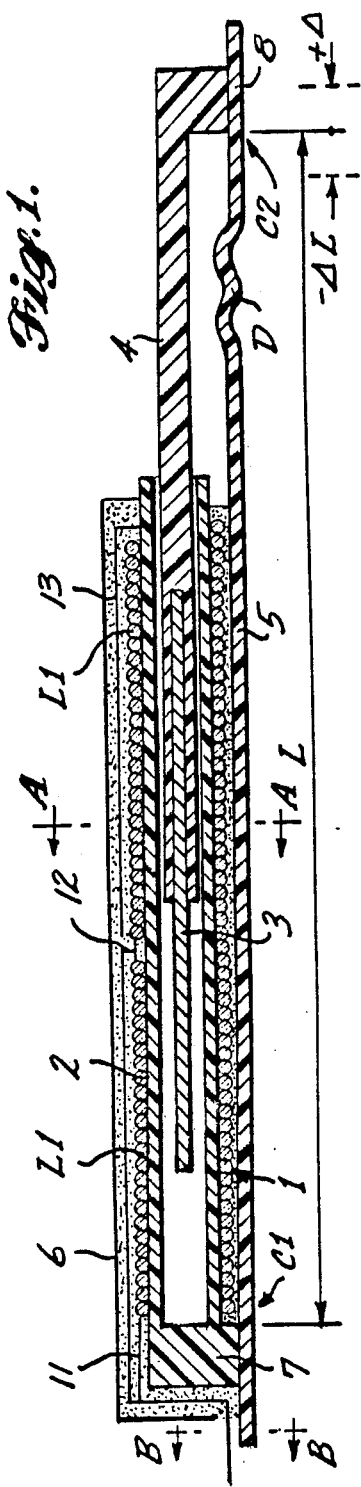
FIG. 1 is a somewhat diagrammatic longitudinal section of an inductance strain gauge in accordance with the present invention.
Figure 2B:
FIG. 2(b) is a somewhat diagrammatic section along line B—B of FIG. 1.
Figure 2A:
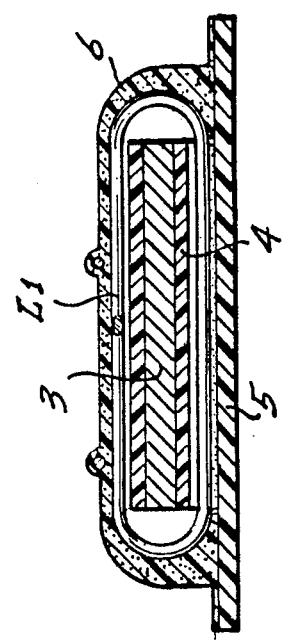
FIG. 2(a) is a somewhat diagrammatic section along line A—A of FIG. 1.

With reference to FIGS. 1, 2(a) and 2(b), the improved inductance strain gauge in accordance with the present invention includes a thin, flat, tubular coil frame 2 around which are wound side-by-side inductive coils $L_1$ and $L_2$ indicated by numeral 1. Each coil is a single layer of wire. The two coils are connected in series and meet at approximately the longitudinal center of the frame. The coil can be secured to the frame by insulative adhesive. In a representative embodiment, the composite inductor, including coils, adhesive and frame, can be 0.25 to 1 millimeter high by approximately 3 to 10 millimeters wide. The length of the inductor is determined at least in part by the number of turns of wire. Preferably, the two side-by-side coils $L_1$ and $L_2$ have the same number of turns of painted copper wire. Each coil can be formed of 20 to 200 turns resulting in a overall length of the improved strain gauge of no more than about 150 millimeters, whereas an overall length of 150 to 400 millimeters can be achieved for two coils of 200 to 800 turns each.

One end portion 7 of the frame 2 is connected to an elongated base sheet or substrate 5 of insulative material such as polyimide. In the illustrated embodiment, such end portion 7 of the insulative frame 2 is closed. The base sheet extends lengthwise below and beyond the composite inductor to an accordion-like wrinkle or wave D and, therebeyond, to the flat end portion of the base sheet coplanar with the end portion to which the composite inductor is attached. In a representative embodiment, the base sheet can be 0.02 to 0.1 millimeter thick.

The composite inductor can be covered with a polyimide sheet 6 secured to the margins of the base sheet 5 by insulative adhesive leaving the mouth of the cavity of the inductor open and unobstructed.

An elongated insulative connecting rod 4 has one end connected to the end portion 8 of the base sheet 5 opposite the end portion to which the inductor frame 2 is connected. The thin and flat connecting rod extends rearward through the open mouth of the cavity of the inductor frame 2. As best seen in FIG. 2(a), the fit of the connecting rod 4 in the frame cavity is close but not snug, and, as seen in FIG. 1, a considerable length of the connecting rod extends into the frame cavity for a smooth sliding fit of the connecting rod in such cavity.

A thin, flat, magnetic core 3 is cantilevered from the free end portion of the connecting rod 4 inside the cavity of the inductor frame 2. The magnetic core can be two to four permalloy or copper foil sheets stacked on top of each other and electrically isolated from each other by insulative adhesive between the sheets. Normally, the elongated core is approximately centered between the opposite ends of the two coils $L_1$ and $L_2$, i.e., one-half of the core extends from the junction of the two coils into the left coil $L_1$ and the other one-half extends from the junction of the two coils into the right coil $L_2$. In a representative embodiment, the core can be 0.05 millimeter to 0.2 millimeter thick. The length of the flat magnetic core is substantially less than the aggregate length of the two coils $L_1$ and $L_2$. Preferably, the ratio of the length of the core to the aggregate length of the two coils is 0.3 to 0.7:1.

Figure 3:
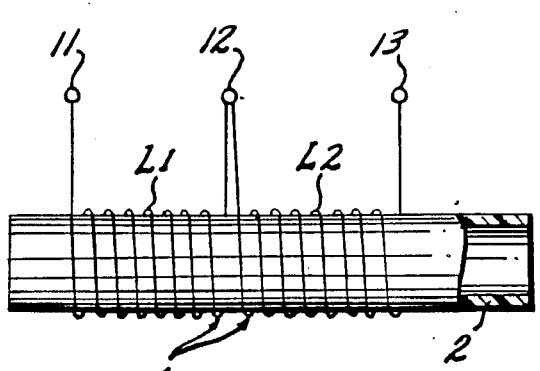
FIG. 3 is a schematic representation of the electrical components of an inductance strain gauge in accordance with the present invention, illustrating the winding directions of the side-by-side coils.

With reference to FIG. 3, the resulting inductance strain gauge in accordance with the present invention has three terminals, namely, an end terminal 11 of coil $L_1$, a common terminal 12 of the adjacent ends of coils $L_1$ and $L_2$ and the remaining end 13 of coil $L_2$ remote from coil $L_1$. Leads from the three terminals can be secured to the base sheet 5 by insulative adhesive, as represented in FIG. 2(b), leaving only their free conductive ends exposed for connection to the measuring equipment.

The finished inductance strain gauge in accordance with the present invntion is extremely small, preferably 0.3 to 1.2 millimeters thick, 3 to 12 millimeters wide and, in a representative embodiment, 4 millimeters long, although the width and length can be adjusted to meet the requirements of the testing situation.

Preferably, the inductance strain gauge is preset by applying an AC voltage of at least two volts to the opposite end terminals end terminals and moving the connecting rod manually until the voltage across coil $L_1$ is equal to the voltage across coil $L_2$, prior to securing the end of the connecting rod remote from the coils to the base sheet 5.

With reference to FIG. 1, in use the opposite end portions $C_1$ and $C_2$ of the base sheet are secured directly to the specimen to be tested, preferably with insulative adhesive. Stress applied to the specimen deforms it, such as by a variation of $\pm \Delta L$. The accordion-like wave D of the base sheet permits a wide range of sliding movement of the connecting rod 4 and the magnetic core 3 in the cavity of the inductor frame. The strain produced can be represented by the following equation:

$$\pm \Delta \epsilon = \frac{\pm \Delta L}{L}$$

For a particular specimen, the strain is approximately linearly proportional to the amount of deformation, i.e., the length of movement of the magnetic core away from its normally centered position, such that the strain is approximately linearly proportional to the output voltage of the coils.

For a permalloy sheet magnetic core, the exciting frequency can be 100 kilohertz to 500 kilohertz. For a copper foil sheet core, the exciting frequency can be 500 kilohertz to 2 megahertz. The coils can be formed of high-tensile painted copper wire for testing temperatures in the range of $-70°$ C. to $+100°$ C., whereas polyimide coated copper wire can be used for temperatures in the range of $+100°$ C. to $+300°$ C.

Figure 4A:
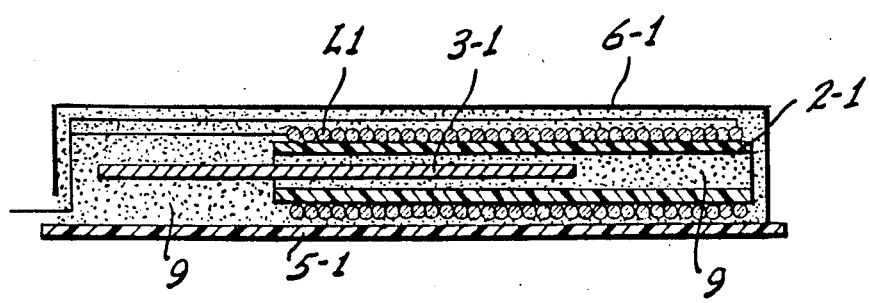
FIGS. 4(a) and 4(b) are corresponding longitudinal sections of a modified form of inductance strain gauge in accordance with the present invention, including a compensating gauge (FIG. 4(a)) and an active gauge (FIG. 4(b)).
Figure 4B:
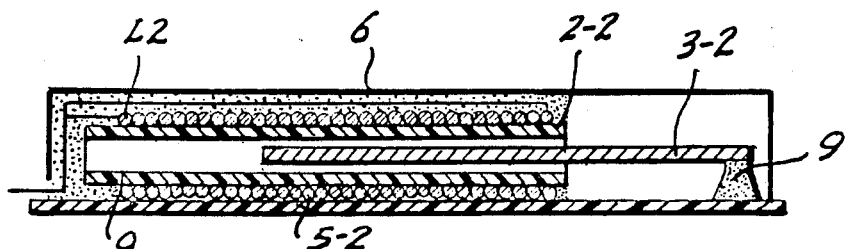

In the embodiment shown in FIG. 4(a) and FIG. 4(b), separate frames 2-1 and 2-2 are used for the two coils $L_1$ and $L_2$, respectively. One frame and coil assembly is secured to a base sheet 5-1 and approximately one-half of an internal magnetic core 3-1 extends into the cavity of the frame. Such magnetic core is fixed in position by a thick layer of insulative adhesive 9 which also fills the cavity of the thin, flat, tubular frame 2-1 and can secure an outer insulative protective sheet 6-1.

The other coil $L_2$ is secured around the other frame 2-2 and is attached to a base sheet 5-2 which can be separate from sheet 5-1 or be a sideways or endwise extension of it. A thin, flat, magnetic core 3-2 has about one-half its length extending into the frame 2-2 and its end remote from the frame is connected to the base sheet by insulative adhesive 9.

The coils $L_1$ and $L_2$ of the separate frames 2-1 and 2-2 are connected. In use, the separate or composite base sheets 5-1 and 5-2 are secured to the specimen to be tested, preferably either side-by-side or end-to-end. Prior to application, the "working" gauge of FIG. 4(b) is tuned by manually positioning its magnetic core 3-2 to match the voltage output for the compensating or "dummy" gauge of FIG. 4(a). Then core 3-2 is secured in position. With both components secured to the specimen, strain is easily measured by the change in output voltage caused by movement of the core 3-2 of the working gauge in its coil $L_2$. For similar applications, the length and height of the working or active strain gauge for the embodiment shown in FIGS. 4(a) and 4(b) can be less than the length and height of the gauge of the embodiment shown in FIG. 1.

I claim:

1. An inductance strain gauge for statically or dynamically measuring strain or stress of a specimen comprising:
   a thin flat tubular coil frame having an open end;
   two inductor coils consisting of wire wound on said frame in a single layer in the same winding direction and connected in series;
   a thin flat magnetic core received in said frame and movable axially therein, said core normally being disposed approximately centrally between said two coils;
   a thin flat elongated connected rod having a first end portion carrying said magnetic core inside said frame, said rod extending from said first end portion out through said open end of said frame to a second end portion thereof remote from said frame;
   a substrate of sheet material having an intermediate portion adapted for extension and contraction, said coil frame and coils being attached and sealed to said substrate adjacent to said intermediate portion, said second end portion of said connecting rod being secured to said substrate at a location opposite said intermediate portion from said frame portion, said substrate being adapted for direct application to the specimen; and
   a protective film covering said two coils and secured to and sealed with opposite margins of said substrate.

2. The gauge defined in claim 1, in which the first end portion of the connecting rod has a slot, the magnetic core having an end portion received in said slot.

3. The gauge defined in claim 1, in which the magnetic core is of a length substantially less than the aggregate length of the two coils.

4. The gauge defined in claim 1, in which the base sheet and protective film are insulative material.

5. The gauge defined in claim 1, in which the base sheet and protective film are polyimide material.

6. The gauge defined in claim 1, in which the two inductor coils have the same number of turns.

7. The gauge defined in claim 1, including a first lead connected to one end of one of the coils, a second lead connected to the opposite end of such coil and to one end of the other coil and a third lead connected to the other end of such other coil, and insulative adhesive securing said three leads to the substrate.

8. The gauge defined in claim 1, in which the connecting rod is insulative material.

9. The gauge defined in claim 1, in which the magnetic core includes stacked sheets of permalloy material.

10. The gauge defined in claim 1, in which the magnetic core includes stacked sheets of copper foil.

11. The gauge defined in claim 1, in which the intermediate portion of the base sheet has accordion-like wrinkles or waves.

12. An inductance strain gauge comprising a first thin flat tubular coil frame of insulative material, a first inductor coil consisting of wire wound on said first frame in a single layer, a first thin flat magnetic core member elongated lengthwise of said first inductor coil and fitted in said first tubular frame, means securing said first core in substantially fixed relationship relative to said first frame and coil, a first base sheet portion of insulative material, means securing said first frame, first coil and first core to said first base sheet portion including a first section of insulative film overlying said first coil and sealed to said first base sheet portion, a second thin flat tubular coil frame of insulative material having an open end portion, a second inductor coil consisting of wire wound on said frame in a single layer and connected to said first inductor coil, a second thin flat magnetic core member slidably received in said second frame and having one end portion received therein, an intermediate portion passing through said open end of said second frame and a second end portion remote from said frame, a second base sheet portion of insulative material including a portion adapted for contraction and extension, means securing said second frame, second coil and second core to said second base sheet portion such that extension and contraction of said intermediate portion results in corresponding sliding movement of said second core member in said second frame and including a second section of insulative film overlying said second coil and sealed to said second base sheet portion, said first and second base sheet portions being adapted to be secured to a specimen in substantially contiguous engagement therewith, whereby strain of the specimen is indicated by the relative positioning of said first coil and core member compared to the relative positioning of said second coil and core member.

13. An inductance strain gauge for testing strain of a specimen comprising insulative base means of thin flat sheet material having a bottom surface for application to a surface of the specimen with said bottom surface substantially contiguously engaging such specimen surface, insulative frame means mounted on said base means, said frame means being of thin flat cross section and including a portion forming an elongated internal cavity having an open end, a first inductance coil mounted on said frame means and having first and second terminal ends, a second inductance coil mounted on said frame means and having third and fourth terminal ends, each of said first and second coils consisting of a single layer of conductive wire and at least said second coil being wrapped around said open-ended internal cavity of said frame means, said coils being connected in series by electrical connection of said second and third terminal ends, and elongated core means of magnetic material of thin flat cross section including a first portion at least partially received in said first inductance coil and a second portion at least partially received in said second inductance coil by reception in said internal cavity of said frame means, said core means normally being positioned such that when electrical power is applied between said first and fourth terminal ends, the voltage between said first and second terminal ends is equal to the voltage between said third and fourth terminal ends, at least said second portion of said magnetic core means being supportingly connected to said base means at a location remote from said frame means, said base means being expandable and contractible as stress is applied to the specimen for moving at least said second portion of said core means relative to at least said second coil so as to indicate strain of the specimen.

* * * * *